United States Patent
Shimada et al.

(10) Patent No.: US 9,862,637 B2
(45) Date of Patent: *Jan. 9, 2018

(54) HEAT-RAY-ABSORBING GLASS PLATE AND METHOD FOR PRODUCING SAME

(71) Applicant: ASAHI GLASS COMPANY, LIMITED, Chiyoda-ku (JP)

(72) Inventors: Yuya Shimada, Chiyoda-ku (JP); Yusuke Arai, Chiyoda-ku (JP); Yuki Kondo, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/290,489

(22) Filed: Oct. 11, 2016

(65) Prior Publication Data

US 2017/0029321 A1    Feb. 2, 2017

Related U.S. Application Data

(63) Continuation of application No. PCT/JP2015/062383, filed on Apr. 23, 2015.

(30) Foreign Application Priority Data

Apr. 23, 2014  (JP) .................. 2014-089594

(51) Int. Cl.

| | |
|---|---|
| *C03C 3/087* | (2006.01) |
| *C03C 3/095* | (2006.01) |
| *C03C 4/02* | (2006.01) |
| *C03C 4/08* | (2006.01) |
| *C03B 19/02* | (2006.01) |

(52) U.S. Cl.
CPC ............. *C03C 3/095* (2013.01); *C03C 3/087* (2013.01); *C03C 4/02* (2013.01); *C03C 4/082* (2013.01); *C03B 19/02* (2013.01); *C03C 2204/00* (2013.01)

(58) Field of Classification Search
CPC .. C03C 3/087; C03C 4/02; C03C 4/08; C03C 4/082; C03C 4/085
See application file for complete search history.

(56) References Cited

U.S. PATENT DOCUMENTS

| | | |
|---|---|---|
| 5,013,487 A | 5/1991 | Cheng |
| 5,925,583 A | 7/1999 | Yoshii et al. |
| 6,673,730 B1 | 1/2004 | Shelestak |
| 8,518,843 B2 | 8/2013 | Shimada et al. |
| 8,962,503 B2 | 2/2015 | Nagai et al. |
| 9,193,621 B2 | 11/2015 | Shimada et al. |
| 2005/0090377 A1 | 4/2005 | Shelestak et al. |
| 2007/0072760 A1 | 3/2007 | Taguchi et al. |
| 2007/0213195 A1 | 9/2007 | Hikata et al. |
| 2013/0316162 A1 | 11/2013 | Murata et al. |

FOREIGN PATENT DOCUMENTS

| | | |
|---|---|---|
| JP | 4-502304 | 4/1992 |
| JP | 9-208254 | 8/1997 |
| JP | 10-152339 | 6/1998 |
| JP | 2002-293571 | 10/2002 |
| JP | 2005-132709 | 5/2005 |
| JP | 2005-162537 | 6/2005 |
| JP | 2005-320225 | 11/2005 |
| JP | 2006-265001 | 10/2006 |
| JP | 2009-242131 | 10/2009 |
| JP | 2010-1216 | 1/2010 |
| JP | 2011-162379 | 8/2011 |
| JP | 2012-180262 | 9/2012 |
| WO | WO 2007/125713 A1 | 11/2007 |
| WO | WO 2011/093284 A1 | 8/2011 |
| WO | WO 2012/102176 A1 | 8/2012 |

OTHER PUBLICATIONS

Machine Translation of JP 2006-265001 A, Oct. 5, 2006.*
International Search Report dated Jun. 23, 2015 in PCT/JP2015/062383, filed on Apr. 23, 2015.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

To provide a heat-absorbing glass plate of which amber coloring is suppressed, and which satisfies both low solar transmittance and high visible light transmittance. The heat-absorbing glass plate of the present invention is one containing iron, tin and sulfur, wherein, as represented by mass % based on oxides, the MgO content is at most 4.5%, the amount of total tin as calculated as $SnO_2$ is less than 0.4%, and the ratio ($SnO_2/SO_3$) of the amount of total tin to the amount of total sulfur as calculated as $SO_3$ is from 0.2 to 100.

23 Claims, 1 Drawing Sheet

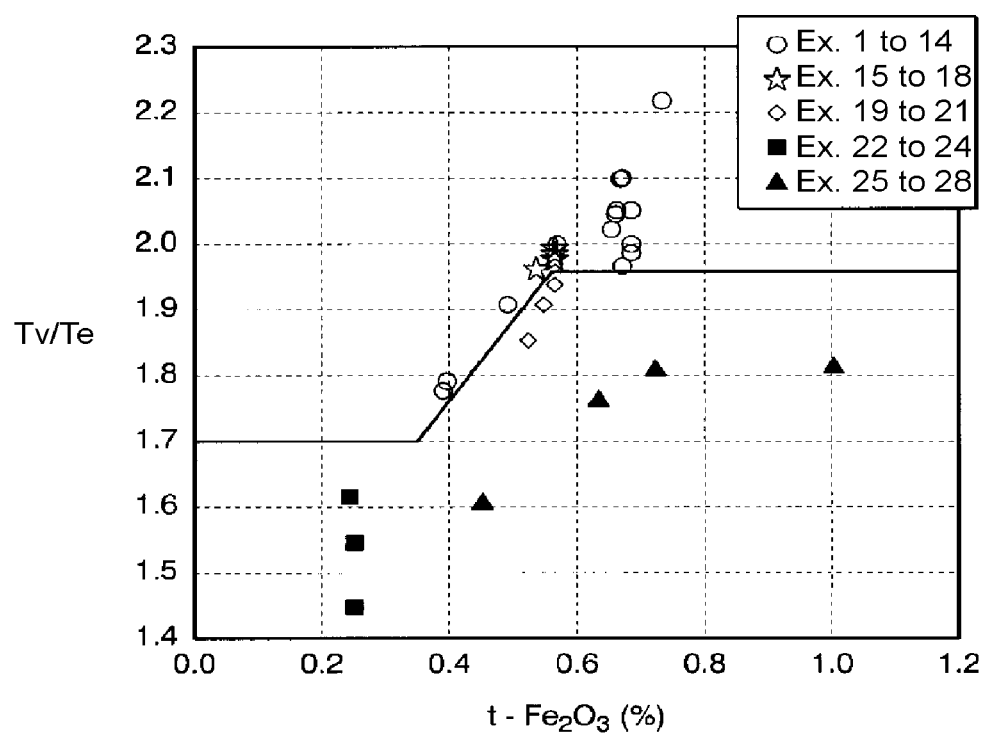

HEAT-RAY-ABSORBING GLASS PLATE AND METHOD FOR PRODUCING SAME

TECHNICAL FIELD

The present invention relates to a heat-absorbing glass plate and a process for its production.

BACKGROUND ART

A heat-absorbing glass plate is required to have a low solar transmittance and a high visible light transmittance. That is, it is required to have a high ratio Tv/Te of the visible light transmittance (by illuminant A, 2° visual field) as defined in JIS R3106 (1998) (hereinafter sometimes referred to as Tv, calculated as 4 mm thickness in the present invention) to the solar transmittance as defined in JIS R3106 (1998) (hereinafter sometimes referred to as Te, calculated as 4 mm thickness in the present invention).

In general, when the amount of total iron as calculated as $Fe_2O_3$ as represented by mass % based on oxides (hereinafter sometimes referred to as t-$Fe_2O_3$ so as to be distinguished from the amount of trivalent iron) is large, the solar transmittance tends to be low and the value of Tv/Te thereby tends to be high, however, the visible light transmittance is low at the same time. If the amount of total iron is small, although the visible light transmittance tends to be high, the solar transmittance tends to be high and the value of Tv/Te tends to be low.

As a heat-absorbing glass plate, for example, Patent Document 1 has been proposed. That is, a heat-absorbing glass plate which is made of soda lime silica glass having a Redox of from 0.38 to 0.60, containing from 0.005 to 0.18% of $SO_3$ as represented by mass % based on oxides, and containing substantially no polysulfide, and which contains, as coloring components, any one of I) to V) as represented by mass % or by mass ppm:

I) total iron as calculated as $Fe_2O_3$: 0.6 to 4%,
  FeO: 0.23 to 2.4%,
  CoO: 40 to 500 ppm,
  Se: 5 to 70 ppm,
  $Cr_2O_3$: 15 to 800 ppm,
  $TiO_2$: 0.02 to 1%.
II) total iron as calculated as $Fe_2O_3$: 0.4 to 1%,
  CoO: 4 to 40 ppm,
  $Cr_2O_3$: 0 to 100 ppm.
III) total iron as calculated as $Fe_2O_3$: 0.9 to 2%,
  FeO: 0.34 to 1.2%,
  CoO: 90 to 250 ppm,
  Se: 0 to 12 ppm,
  $TiO_2$: 0 to 0.9%.
IV) total iron as calculated as $Fe_2O_3$: 0.7 to 2.2%,
  FeO: 0.266 to 1.32%,
  Se: 3 to 100 ppm,
  CoO: 0 to 100 ppm.
V) total iron as calculated as $Fe_2O_3$: 0.9 to 2%,
  FeO: 0.34 to 1.2%,
  CoO: 40 to 150 ppm,
  $Cr_2O_3$: 250 to 800 ppm,
  $TiO_2$: 0.1 to 1%.

Further, Patent Document 2 discloses a heat-absorbing glass plate which has a solar transmittance of at most 42% calculated as 4 mm thickness, which has a visible light transmittance (by illuminant A, 2° visual field) of at least 70% calculated as 4 mm thickness, which provides a transmitted light having a dominant wavelength of from 492 to 520 nm, and which is made of soda lime silica glass having substantially the following composition, as represented by mass % based on oxides:

$SiO_2$: 65 to 75%, $Al_2O_3$: more than 3% and at most 6%, MgO: at least 0% and less than 2%, CaO: 7 to 10%, total iron as calculated as $Fe_2O_3$: 0.45 to 0.65%, and $TiO_2$: 0.2 to 0.8%, and containing substantially no member selected from the group consisting of CoO, $Cr_2O_3$, $V_2O_5$ and MnO, wherein the ratio (Redox) of the mass of divalent FeO to the mass of total iron which is the amount of total iron as calculated as $Fe_2O_3$ is higher than 42% and at most 60%.

Further, Patent Document 3 proposes a colored glass plate made of alkali-containing silica glass containing iron, tin and sulfur, wherein the amount of total sulfur as calculated as $SO_3$ as represented by mass % based on oxides is at least 0.025%, the ratio (Redox) of divalent iron as calculated as $Fe_2O_3$ to total iron as calculated as $Fe_2O_3$ is from 60 to 80% as represented by mass %, and the proportion of divalent tin in total tin is at least 0.1% as represented by mol %.

PRIOR ART DOCUMENTS

Patent Documents

Patent Document 1: U.S. Pat. No. 6,673,730
Patent Document 2: WO2012/102176
Patent Document 3: WO2011/093284

DISCLOSURE OF INVENTION

Technical Problem

Some of the heat-absorbing glass plates disclosed in Patent Document 1 have low Te and high Tv, however, the value of Tv/Te is low if the amount of total iron is small, and if the amount of total iron is large, the solar transmittance is low and the value of Tv/Te is high, however, the value of Tv/Te is not sufficient relative to the amount of total iron.

Among the heat-absorbing glass plates disclosed in Patent Document 2, some of glass plates having high Redox have a high value of Tv/Te, however, if they contain $SO_3$, they tend to undergo amber coloring due to high Redox.

The glass plate disclosed in Patent Document 3 is less likely to be amber since it contains tin, however, it has high Te since it has a low MgO content.

The present invention provides a heat-absorbing glass plate which satisfies both low solar transmittance and high visible light transmittance and which is less likely to undergo amber coloring, and a process for its production.

Solution to Problem

The heat-absorbing glass plate of the present invention is one containing iron, tin and sulfur, wherein, as represented by mass % based on oxides, the MgO content is at most 4.5%, the amount of total tin as calculated as $SnO_2$ is less than 0.4%, and the ratio ($SnO_2/SO_3$) of the amount of total tin to the amount of total sulfur as calculated as $SO_3$ is from 0.2 to 100.

The heat-absorbing glass plate of the present invention may be such that the ratio Tv/Te of the visible light transmittance Tv (by illuminant A, 2° visual field) as defined in JIS R3106 (1998) to the solar transmittance Te as defined in JIS R3106 (1998), and the amount of total iron t-$Fe_2O_3$ as calculated as $Fe_2O_3$ as represented by mass % based on oxides, calculated as 4 mm thickness of the glass plate, are in a relation of the following formulae:

$Tv/Te > 1.70$ when $t\text{-}Fe_2O_3$ is less than 0.351%;

$Tv/Te > 1.252 \times (t\text{-}Fe_2O_3) + 1.260$ when $t\text{-}Fe_2O_3$ is at least 0.351% and less than 0.559%; and $Tv/Te > 1.960$ when $t\text{-}Fe_2O_3$ is at least 0.559%.

The heat-absorbing glass plate of the present invention may provide a transmitted light having a dominant wavelength Dw of less than 492 nm calculated as 4 mm thickness of the glass plate as defined in JIS Z8701 (1982), in order to obtain a blue glass plate.

The heat-absorbing glass plate of the present invention may provide a transmitted light having a dominant wavelength Dw of at least 492 nm calculated as 4 mm thickness of the glass plate as defined in JIS Z8701 (1982), in order to obtain a green glass plate. The heat-absorbing glass plate of the present invention may be such that the ratio Tv/Te of the visible light transmittance Tv (by illuminant A, 2° visual field) as defined in JIS R3106 (1998) to the solar transmittance Te as defined in JIS R3106 (1998), calculated as 4 mm thickness of the glass plate, is at least 2.0.

The heat-absorbing glass plate of the present invention may be such that the solar transmittance Te is at most 50% calculated as 4 mm thickness of the glass plate as defined in JIS R3106 (1998), and the visible light transmittance Tv (by illuminant A, 2° visual field) is at least 60% calculated as 4 mm thickness of the glass plate as defined in JIS R3106 (1998).

The heat-absorbing glass plate of the present invention may be such that the amount of total sulfur as calculated as $SO_3$ as represented by mass % based on oxides is at least 0.005% and at most 0.1%.

The heat-absorbing glass plate of the present invention may be such that the amount of total iron as calculated as $Fe_2O_3$ as represented by mass % based on oxides is from 0.01% to 1.0%.

The heat-absorbing glass plate of the present invention may be such that the proportion of divalent iron as calculated as $Fe_2O_3$ to the total iron as calculated as $Fe_2O_3$ is at least 55%.

The heat-absorbing glass plate of the present invention may be such that the ratio of $SnO_2/SO_3$ to Fe-redox i.e. $(SnO_2/SO_3)$/Fe-redox is from 0.0025 to 5.

The heat-absorbing glass plate of the present invention may be made of soda lime silica glass having the following composition as represented by mass % based on oxides:

$SiO_2$: 65 to 75%,
$Al_2O_3$: more than 3% and at most 6%,
MgO: at least 0% and less than 2%,
CaO: 7 to 10%,
$Na_2O$: 5 to 18%,
$K_2O$: 0 to 5%,
total iron as calculated as $Fe_2O_3$: 0.3 to 0.9%, and
total tin as calculated as $SnO_2$: 0.02 to 0.3%.

The heat-absorbing glass plate of the present invention may contain substantially no $TiO_2$, in order to obtain a blue or green glass plate. Containing substantially no member means that the member is not contained except for inevitable impurities (the same applies hereinafter).

The heat-absorbing glass plate of the present invention may substantially contain $TiO_2$ and have a $TiO_2$ content of at most 3% as represented by mass % based on oxides, in order to lower the ultraviolet transmittance and to obtain a green or yellow glass plate.

The heat-absorbing glass plate of the present invention may contain substantially no $CeO_2$ in order to reduce the cost.

The heat-absorbing glass plate of the present invention may substantially contain $CeO_2$ and have a $CeO_2$ content of at most 3% as represented by mass % based on oxides, in order to lower the ultraviolet transmittance.

The heat-absorbing glass plate of the present invention may be such that β-OH is at least 0.15 $mm^{-1}$.

The process for producing a heat-absorbing glass plate of the present invention is a process which comprises melting a glass raw material, followed by forming to produce soda lime silica glass, wherein the glass after the forming is a heat-absorbing glass plate containing iron, tin and sulfur, wherein, as represented by mass % based on oxides, the MgO content is at most 4.5%, the amount of total tin as calculated as $SnO_2$ is less than 0.4%, and the ratio $(SnO_2/SO_3)$ of the amount of total tin to the amount of total sulfur as calculated as $SO_3$ is from 0.2 to 100.

The expression "to" defining the above numerical range is used to include the numerical values before and after it as the lower limit value and the upper limit value, and hereinafter in this specification, "to" is used to have the same meaning unless otherwise specified.

Advantageous Effects of Invention

The heat-absorbing glass plate of the present invention satisfies both low solar transmittance and high visible light transmittance. Particularly, according to the present invention, it is possible to obtain a heat-absorbing glass having a ratio Tv/Te of the visible light transmittance higher than conventional glass, relative to the amount of total iron $t\text{-}Fe_2O_3$ as calculated as $Fe_2O_3$ as represented by mass % based on oxides.

BRIEF DESCRIPTION OF DRAWING

FIG. 1 is a graph illustrating the relation between $t\text{-}Fe_2O_3$ and Tv/Te in Ex. 1 to 28.

DESCRIPTION OF EMBODIMENTS

Now, the present invention will be described with reference to an embodiment.

The heat-absorbing glass plate according to an embodiment of the present invention contains iron, tin and sulfur, and is characterized in that Tv/Te and the amount of total iron $t\text{-}Fe_2O_3$ as calculated as $Fe_2O_3$ as represented by mass % based on oxides, calculated as 4 mm thickness of the glass plate, satisfy the relation of the following formulae, by adjusting the MgO content, the amount of total tin as calculated as $SnO_2$ and the ratio $(SnO_2/SO_3)$ of the amount of total tin to the amount of total sulfur as calculated as $SO_3$.

$Tv/Te > 1.70$ when $t\text{-}Fe_2O_3$ is less than 0.351%;

$Tv/Te > 1.252 \times (t\text{-}Fe_2O_3) + 1.260$ when $t\text{-}Fe_2O_3$ is at least 0.351% and less than 0.559%; and $Tv/Te > 1.960$ when $t\text{-}Fe_2O_3$ is at least 0.559%.

Of the heat-absorbing glass plate according to the present embodiment, the MgO content as represented by mass % based on oxides is at most 4.5%. MgO is a component to accelerate melting of the glass raw material and improve the weather resistance.

When the MgO content is at most 4.5%, devitrification hardly occurs. Further, a heat-absorbing glass plate having a MgO content of at most 4.5% has low Te as compared with a heat-absorbing glass plate having a MgO content of at least 4.5% at the same Tv. Accordingly, when the MgO content is at most 4.5%, the heat-absorbing property can readily be improved without impairing the visible light transmittance.

The MgO content is, as represented by mass % based on oxides, preferably at least 0% and less than 2.0%, more preferably from 0 to 1.0%, further preferably from 0 to 0.5%, particularly preferably from 0% to 0.2%, and it is most preferred that substantially no MgO is contained.

The heat-absorbing glass plate according to the present embodiment contains tin and has an amount of total tin of less than 0.4% as calculated as $SnO_2$ as represented by mass % based on oxides. $SnO_2$ functions as a buffering agent in oxidation-reduction reaction of iron and sulfur and suppresses amber coloring. When the amount of total tin as calculated as $SnO_2$ is less than 0.4%, volatilization of $SnO_2$ tends to be small, and the cost can be kept low. The amount of total tin as calculated as $SnO_2$ is, as represented by mass % based on oxides, preferably from 0.02 to 0.3%, more preferably from 0.05 to 0.25%, further preferably from 0.09 to 0.23%, particularly preferably from 0.15 to 0.22%.

The content of total sulfur as calculated $SO_3$ in the heat-absorbing glass plate according to the present embodiment is, as represented by mass % based on oxides, preferably at least 0.005% and at most 0.1%. When the content of total sulfur as calculated as $SO_3$ is at least 0.005%, a favorable refining effect at the time of melting glass tends to be obtained, and no bubble remaining will occur. The $SO_3$ content is, as represented by mass % based on oxides, more preferably at least 0.008%, further preferably at least 0.01%, particularly preferably at least 0.013%. On the other hand, if the amount of $SO_3$ is too large, Tv tends to decrease due to amber coloring. The $SO_3$ content is, as represented by mass % based on oxides, more preferably at most 0.05%, further preferably at most 0.03%, particularly preferably less than 0.02%, most preferably less than 0.016%.

In the heat-absorbing glass plate according to the present embodiment, the ratio ($SnO_2/SO_3$) of the amount of total tin to the amount of total sulfur is from 0.2 to 100. When the ratio of the total tin to the amount of total sulfur ($SnO_2/SO_3$) is at least 0.2, amber coloring can be suppressed. When the ratio is at most 100, volatilization tends to be small, and the cost can be kept low. The ratio $SnO_2/SO_3$ is more preferably from 1 to 50, further preferably from 3 to 30, particularly preferably from 5 to 20.

Of the heat-absorbing glass plate according to the present embodiment, the amount of total iron as calculated as $Fe_2O_3$ as represented by mass % based on oxides is preferably at least 0.01% and at most 1.0%. When the content of total iron as calculated as $Fe_2O_3$ is at least 0.01%, Te can be kept low. Along with an increase of the amount of total iron as calculated as $Fe_2O_3$, Te decreases but Tv also decreases. When the amount of total iron as calculated as $Fe_2O_3$ is at most 1.0%, a decrease of Tv can be prevented and Tv/Te can be made to be at least 1.85 (calculated as 4 mm thickness). The amount of total iron as calculated as $Fe_2O_3$ is, as represented by mass % based on oxides, more preferably from 0.1 to 0.9%, further preferably from 0.3 to 0.9%, still more preferably from 0.4 to 0.8%, particularly preferably from 0.5 to 0.75%, most preferably from 0.60 to 0.70%.

In this specification, the content of total iron is represented as an amount of $Fe_2O_3$ in accordance with a standard method of analysis, however, not the entire iron present in glass is present as trivalent iron.

Usually, divalent iron is present in glass. Divalent iron has an absorption peak in the vicinity of a wavelength of 1,100 nm, and trivalent iron has an absorption peak in the vicinity of a wavelength of 400 nm. Accordingly, when attention is focused on the infrared absorptivity, the amount of divalent iron ($Fe^{2+}$) is preferably larger than trivalent iron ($Fe^{3+}$). Accordingly, with a view to keeping Te low, the proportion of the mass of divalent FeO to the mass of total iron as calculated as $Fe_2O_3$ (hereinafter referred to as Fe-redox, i.e. Fe-redox (%) is represented by $Fe^{2+}/(Fe^{2+}+Fe^{3+})$) is preferably increased.

Fe-redox in the heat-absorbing glass plate according to the present embodiment is preferably at least 55%. When Fe-redox is at least 55%, Te can be kept low. Fe-redox is preferably at least 57%, more preferably at least 59%. On the other hand, if Fe-redox is too high, the step of melting the glass raw material tends to be complicated. Fe-redox is preferably at most 80%, more preferably at most 70%, further preferably at most 65%.

Of the heat-absorbing glass plate according to the present embodiment, the ratio of $SnO_2/SO_3$ to Fe-redox i.e. ($SnO_2/SO_3$)/Fe-redox is preferably from 0.0025 to 5. When it is at least 0.0025, amber coloring can be suppressed. When it is at most 5, volatilization tends to be small, and the cost can be kept low. It is more preferably from 0.05 to 3, further preferably from 0.08 to 2, particularly preferably from 0.15 to 1, most preferably from 0.2 to 0.5.

The heat-absorbing glass plate according to the present embodiment is preferably made of soda lime silica glass having the following composition, as represented by mass % based on oxides. Particularly, the heat-absorbing glass plate according to the present embodiment preferably comprises soda lime silica glass having substantially the following composition, as represented by mass % based on oxides:

$SiO_2$: 65 to 75%,
$Al_2O_3$: more than 3% and at most 6%,
MgO: at least 0% and less than 2%,
CaO: 7 to 10%,
$Na_2O$: 5 to 18%,
$K_2O$: 0 to 5%,
total iron as calculated as $Fe_2O_3$: 0.3 to 0.9%, and
total tin as calculated as $SnO_2$: 0.02 to 0.3%.

When the $SiO_2$ content is at least 65%, the weather resistance will be good. When the $SiO_2$ content is at most 75%, devitrification hardly occurs. The $SiO_2$ content is, as represented by mass % based on oxides, preferably from 67 to 73%, more preferably from 68 to 71%.

$Al_2O_3$ is a component to improve the weather resistance. When the $Al_2O_3$ content is more than 3%, the weather resistance will be good. When the $Al_2O_3$ content is at most 6%, the melting property will be good. The $Al_2O_3$ content is, as represented by mass % based on oxides, preferably from 3.1 to 5%, more preferably from 3.2 to 4%.

CaO is a component to accelerate melting of the glass raw material and to improve the weather resistance.

When the CaO content is at least 7%, the melting property and weather resistance will be good. When the CaO content is at most 10%, devitrification hardly occurs. The CaO content is, as represented by mass % based on oxides, preferably from 7.5 to 9.5%, more preferably from 8 to 9%.

$Na_2O$ is a component to accelerate melting of the glass raw material. When the $Na_2O$ content is at least 5%, the melting property will be good. When the $Na_2O$ content is at most 18%, the weather resistance will be good. The $Na_2O$ content is, as represented by mass % based on oxides, preferably from 10 to 17%, more preferably from 12 to 16%, particularly preferably from 14 to 15%.

$K_2O$ is a component to accelerate melting of the glass raw material. When the $K_2O$ content is at most 5%, the weather resistance will be good. The $K_2O$ content is, as represented by mass % based on oxides, preferably from 0.5 to 3%, more preferably from 1 to 2%, further preferably from 1.3 to 1.7%.

The heat-absorbing glass plate according to the present embodiment may contain SrO in order to accelerate melting of the glass raw material. The SrO content is, as represented by mass % based on oxides, preferably from 0 to 5%, more preferably from 0 to 3%, further preferably at most 1%, still further preferably at most 0.5%, and it is more preferred that substantially no SrO is contained. When the SrO content is at most 5%, it is possible to sufficiently accelerate melting of the glass raw material.

Further, the heat-absorbing glass plate according to the present embodiment may contain BaO in order to accelerate melting of the glass raw material. The BaO content is, as represented by mass % based on oxides, preferably from 0 to 5%, more preferably from 0 to 3%, further preferably at most 1%, still more preferably at most 0.5%, and it is more preferred that substantially no BaO is contained. When the BaO content is at most 5%, it is possible to sufficiently accelerate melting of the glass raw material.

The heat-absorbing glass plate according to the present embodiment may contain substantially no $TiO_2$ in order to obtain a blue or green glass plate, not yellow.

The heat-absorbing glass plate according to the present embodiment may contain $TiO_2$ in a content of more than 0% as represented by mass % based on oxides, in order to lower the ultraviolet transmittance and to obtain a green or yellow glass plate. When it contains $TiO_2$ in a content more than 0%, the ultraviolet transmittance will be lowered, and a green or yellow glass plate can be obtained. The $TiO_2$ content is more preferably at least 0.1%, further preferably at least 0.3%, particularly preferably at least 0.5%. On the other hand, when the $TiO_2$ content is at most 3%, Tv can be made high. It is more preferably at most 2%, further preferably at most 1%.

The heat-absorbing glass plate according to the present embodiment may contain substantially no $CeO_2$, in order to reduce the cost.

In order to lower the ultraviolet transmittance, the heat-absorbing glass plate according to the present embodiment may contain $CeO_2$ in a content of more than 0% as represented by mass % based on oxides, whereby the ultraviolet transmittance can be lowered. The $CeO_2$ content is more preferably at least 0.1%, further preferably at least 0.3%, particularly preferably at least 0.5%. On the other hand, when the $CeO_2$ content is at most 3%, Tv can be made high, and the cost can be kept low. It is more preferably at most 2%, further preferably at most 1%, particularly preferably less than 0.8%, most preferably less than 0.6%.

The specific gravity of the heat-absorbing glass plate according to the present embodiment is preferably from 2.48 to 2.55, more preferably from 2.50 to 2.53. When the specific gravity of the heat-absorbing glass plate according to the present invention is adjusted to be equal to that of conventional soda lime silica glass, the efficiency for the change of the composition (i.e. the change of the glass base) at the time of production can be improved.

The specific gravity of the heat-absorbing glass plate according to the present embodiment can be adjusted by adjusting the glass composition. In order to obtain the above specific gravity, the mass ratio of $SiO_2/(MgO+CaO)$ is adjusted to be preferably from 6.0 to 9.0, more preferably from 6.7 to 8.7. Further, also in a case where SrO and/or BaO is contained, the mass ratio of $SiO_2/(MgO+CaO+SrO+BaO)$ is likewise adjusted to be preferably from 6.0 to 9.0, more preferably from 6.7 to 8.7.

The heat-absorbing glass plate according to the present embodiment preferably provides a transmitted light having a dominant wavelength Dw of less than 492 nm calculated as 4 mm thickness of the glass plate as defined in JIS Z8701 (1982), in order to obtain a blue glass plate. The dominant wavelength is more preferably less than 491 nm, further preferably less than 490 nm, particularly preferably less than 489 nm.

The heat-absorbing glass plate according to the present embodiment preferably provides a transmitted light having a dominant wavelength Dw of at least 492 nm calculated as 4 mm thickness of the glass plate as defined in JIS Z8701 (1982) in order to obtain a green glass plate. The dominant wavelength is more preferably from 494 to 565 nm, further preferably from 496 to 560 nm, particularly preferably from 498 to 530 nm, most preferably from 499 to 510 nm.

Tv/Te greatly depends on the amount of total iron $t\text{-}Fe_2O_3$ as calculated as $Fe_2O_3$. If $t\text{-}Fe_2O_3$ is small, it is difficult to achieve high Tv/Te, and when $t\text{-}Fe_2O_3$ is large, it is relatively easily to achieve high Tv/Te. The heat-absorbing glass plate according to the present embodiment is characterized by having high Tv/Te as compared with a conventional heat-absorbing glass plate with the same $t\text{-}Fe_2O_3$.

Tv/Te of the heat-absorbing glass plate according to the present embodiment is higher than 1.70 when $t\text{-}Fe_2O_3$ calculated as 4 mm thickness of the glass plate is less than 0.351%. When Tv/Te is higher than 1.70, both low solar transmittance and high visible light transmittance can be satisfied. Tv/Te is preferably higher than 1.75, more preferably higher than 1.80.

Further, Tv/Te is higher than the value determined by "$1.252\times(t\text{-}Fe_2O_3)+1.260$" when $t\text{-}Fe_2O_3$ is at least 0.351% and less than 0.559%. When Tv/Te is higher than the value determined by "$1.252\times(t\text{-}Fe_2O_3)+1.260$", both low solar transmittance and high visible light transmittance can be satisfied.

Further, also when $t\text{-}Fe_2O_3$ is at least 0.559%, Tv/Te may be higher than the value determined by "$1.252\times(t\text{-}Fe_2O_3)+1.260$". Tv/Te is preferably higher than the value determined by "$1.252\times(t\text{-}Fe_2O_3)+1.270$", more preferably higher than the value determined by "$1.252\times(t\text{-}Fe_2O_3)+1.280$".

Further, when $t\text{-}Fe_2O_3$ is at least 0.559%, Tv/Te is higher than 1.960. When Tv/Te is higher than 1.960, both low solar transmittance and high visible light transmittance can be satisfied. Tv/Te is preferably higher than 1.970 when $t\text{-}Fe_2O_3$ is at least 0.567%, it is more preferably higher than 1.980 when $t\text{-}Fe_2O_3$ is at least 0.575%, it is particularly preferably higher than 1.990 when $t\text{-}Fe_2O_3$ is at least 0.583%, and it is most preferably higher than 2.0 when $t\text{-}Fe_2O_3$ is at least 0.951%.

Te of the heat-absorbing glass plate according to the present embodiment is preferably at most 50%, more preferably at most 45%, further preferably at most 40%, particularly preferably at most 35%. In the present embodiment, Te of the heat-absorbing glass plate means the value of Te when the thickness of the heat-absorbing glass plate is calculated as 4 mm thickness, and in this specification, it may be represented simply by "calculated as 4 mm thickness". Te is the solar transmittance calculated by measuring the transmittance by a spectrophotometer in accordance with JIS R3106 (1998) (hereinafter referred to simply as JIS R3106).

Tv of the heat-absorbing glass plate of the present embodiment is preferably at least 60%, more preferably at least 65%, further preferably at least 70%. In the present embodiment, Tv of the heat-absorbing glass plate means the value of Tv when the thickness of the heat-absorbing glass plate is calculated as 4 mm thickness, and in this specification, it may be represented simply by "calculated as 4 mm thickness". Tv is the visible light transmittance calculated by measuring the transmittance by a spectrophotometer in accordance with JIS R3106. The coefficient is a value of the 2 degree field of view with illuminant A.

β-OH as an index showing the water content in the heat-absorbing glass plate according to the present embodiment, is preferably at least 0.15 mm$^{-1}$, whereby the refining ability can be improved, and the temperature in the bending step can be decreased. β-OH is preferably from 0.15 to 0.45 mm$^{-1}$, more preferably from 0.20 to 0.35 mm$^{-1}$, further preferably from 0.23 to 0.30 mm$^{-1}$, particularly preferably from 0.25 to 0.28 mm$^{-1}$. Here, β-OH is a value obtained by the following formula.

$$\beta\text{-OH (mm}^{-1}) = -\log_{10}(T_{3500} \text{ cm}^{-1}/T_{4000} \text{ cm}^{-1})/t$$

In the above formula, $T_{3500}$ cm$^{-1}$ is a transmittance (%) at a wave number of 3,500 cm$^{-1}$, $T_{4000}$ cm$^{-1}$ is a transmittance (%) at a wavelength number of 4,000 cm$^{-1}$, and t is the thickness (mm) of the glass plate.

The heat-absorbing glass plate according to the present embodiment can be used either for vehicles and for building, and is particularly suitable as glass for building. When it is used as window glass for an automobile, as the case requires, it is formed into laminated glass having an interlayer sandwiched between a plurality of glass plates, glass having flat glass processed to have a curved surface, or tempered glass. Further, when it is used as double glazing for building, it is used as double glazing comprising two sheets of the heat-absorbing glass plates of the present invention or as double glazing of the heat-absorbing glass plate of the present invention and another glass plate.

The heat-absorbing glass plate according to the present embodiment is produced, for example, by means of the following steps (i) to (v) in order.

(i) A glass matrix material such as silica sand, coloring component materials such as an iron source, a reducing agent, a refining agent and the like are mixed to achieve the desired glass composition to prepare a glass raw material.

(ii) The glass raw material is continuously supplied to a melting furnace, heated to a temperature of from about 1,400° C. to 1,550° C. (e.g. about 1,500° C.) by burning heavy oil, natural gas or the like, and melted to form molten glass.

(iii) The molten glass is refined and then formed into a glass plate having a predetermined thickness by a glass plate-forming method such as a float process.

(iv) The glass plate is annealed and cut into a predetermined size to obtain a heat-absorbing glass plate of the present invention.

(v) As the case requires, the cut glass plate may be tempered, may be formed into laminated glass, or may be formed into double glazing.

The glass matrix material may be one used as a material of conventional soda lime silica glass, such as silica sand, soda ash, lime stone or feldspar.

The iron source may, for example, be iron powder, iron oxide powder or red iron oxide.

The reducing agent may, for example, be carbon or coke. The reducing agent is to suppress oxidation of iron in the molten glass and to adjust Fe-redox to a desired level.

The above-described heat-absorbing glass plate according to the present embodiment contains iron, tin and sulfur, and is characterized in that by adjusting the MgO content, the amount of total tin as calculated as $SnO_2$ and the ratio ($SnO_2/SO_3$) of the amount of total tin to the amount of total sulfur, Tv/Te, and the amount of total iron t-$Fe_2O_3$ as calculated as $Fe_2O_3$ as represented by mass % based on oxides, calculated as 4 mm thickness of the glass plate, satisfy the relation of the following formulae:

Tv/Te>1.70 when t-$Fe_2O_3$ is less than 0.351%;

Tv/Te>1.252×(t-$Fe_2O_3$)+1.260 when t-$Fe_2O_3$ is at least 0.351% and less than 0.559%; and Tv/Te>1.960 when t-$Fe_2O_3$ is at least 0.559%.

EXAMPLES

Now, the present invention will be described in detail with reference to Examples. However, it should be understood that the present invention is by no means restricted to such specific Examples. (Fe-redox)

With respect to the obtained glass plate, Fe-redox was calculated from a spectral curve of glass measured by a spectrophotometer.

(Tv)

With respect to the obtained glass plate, the visible light transmittance (Tv) (a value under measuring conditions of illuminant A and 2° visual field) as defined in JIS R3106 was obtained as a value calculated as 4 mm thickness.

(Te)

With respect to the obtained glass plate, the solar transmittance (Te) as defined in JIS R3106 was obtained as a value calculated as 4 mm thickness.

(Dw)

With respect to the obtained glass plate, the dominant wavelength (Dw) of the transmitted light as defined in JIS Z8701 (1982) was obtained as a value calculated as 4 mm thickness.

(Measurement of β-OH)

With respect to the obtained glass plate, β-OH was calculated in accordance with the following formula from an infrared absorption spectral curve of glass measured by FT-IR.

$$\beta\text{-OH (mm}^{-1}) = -\log_{10}(T_{3500} \text{ cm}^{-1}/T_{4000} \text{ cm}^{-1})/t$$

In the above formula, $T_{3500}$ cm$^{-1}$ is the transmittance (%) at a wave number of 3,500 cm$^{-1}$, $T_{4000}$ cm$^{-1}$ is the transmittance (%) at a wave number of 4,000 cm$^{-1}$, and t is the thickness (mm) of the glass plate.

Glass matrix materials such as silica sand, coke, an iron source, $SnO_2$ and salt cake ($Na_2SO_4$) were mixed to achieve compositions as identified in Tables 1 to 5 to prepare glass raw materials. Each glass raw material was put into a crucible and heated at 1,500° C. for 2 hours to form molten glass. The molten glass was cast on a carbon plate and cooled. Both surfaces of the obtained plate-form glass were polished to obtain a glass plate having a thickness of 4 mm. With respect to the glass plate, the transmittance was measured every 1 nm by using a spectrophotometer (manufactured by PerkinElmer Co., Ltd., Lambda 950) to determine Te, Tv and Dw. Further, the above glass was polished to a thickness of 2 mm, and with respect to this glass plate, the transmittance was measured every 1 cm$^{-1}$ by FT-IR (manufactured by Thermo Nicolet Corporation, Thermo Nicolet Avatar 370), and β-OH was obtained based on the above formula. The results are shown in Tables 1 to 5.

Numerical values in brackets for Tv, Te, Dw and Tv/Te in Table 5 are calculated values.

TABLE 1

|  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Composition (%) | $SiO_2$ | 70.7 | 70.7 | 70.5 | 70.3 | 70.2 | 70.0 | 70.1 | 70.1 | 69.9 |
|  | $Al_2O_3$ | 3.4 | 3.4 | 3.3 | 3.3 | 3.3 | 3.3 | 3.3 | 3.3 | 3.3 |
|  | MgO | 0.0 | 0.0 | 0.1 | 0.1 | 0.1 | 0.1 | 0.1 | 0.1 | 0.1 |
|  | CaO | 9.5 | 9.5 | 9.5 | 9.5 | 9.5 | 9.5 | 9.4 | 9.4 | 9.4 |
|  | $Na_2O$ | 13.9 | 14.0 | 14.3 | 14.2 | 14.1 | 14.1 | 14.1 | 14.0 | 14.0 |
|  | $K_2O$ | 1.6 | 1.6 | 1.5 | 1.5 | 1.5 | 1.5 | 1.5 | 1.5 | 1.5 |
|  | $t\text{-}Fe_2O_3$ | 0.66 | 0.66 | 0.65 | 0.57 | 0.49 | 0.40 | 0.39 | 0.67 | 0.73 |
|  | $TiO_2$ | 0.02 | 0.02 | 0.01 | 0.33 | 0.60 | 0.88 | 0.80 | 0.71 | 0.84 |
|  | $CeO_2$ |  |  |  |  |  |  |  |  |  |
|  | $SnO_2$ | 0.19 | 0.19 | 0.19 | 0.21 | 0.21 | 0.21 | 0.21 | 0.21 | 0.21 |
|  | $SO_3$ | 0.006 | 0.007 | 0.020 | 0.021 | 0.022 | 0.024 | 0.023 | 0.014 | 0.014 |
| Fe-redox (%) |  | 61 | 66 | 60 | 63 | 61 | 62 | 62 | 59 | 62 |
| $SnO_2/SO_3$ |  | 30.31 | 29.13 | 9.50 | 10.00 | 9.55 | 8.75 | 9.13 | 15.03 | 15.00 |
| $(SnO_2/SO_3)$/Fe-redox |  | 0.49 | 0.44 | 0.16 | 0.16 | 0.16 | 0.14 | 0.15 | 0.26 | 0.24 |
| β-OH ($mm^{-1}$) |  | 0.28 | 0.26 | 0.36 | 0.28 | 0.28 | 0.28 | 0.28 | 0.26 | 0.27 |
| Tv (%) |  | 68.4 | 66.8 | 68.8 | 69.8 | 72.1 | 74.8 | 75.2 | 65.1 | 62.2 |
| Te (%) |  | 33.4 | 31.8 | 33.9 | 34.9 | 37.7 | 41.7 | 42.3 | 30.9 | 28.0 |
| Dw (nm) |  | 487.7 | 488.1 | 488.1 | 491.6 | 495.9 | 501.7 | 499.5 | 499.6 | 503.7 |
| Tv/Te |  | 2.05 | 2.10 | 2.03 | 2.00 | 1.91 | 1.79 | 1.78 | 2.11 | 2.22 |
| $1.252 \times (t\text{-}Fe_2O_3) + 1.260$ |  | 2.09 | 2.09 | 2.07 | 1.97 | 1.87 | 1.76 | 1.75 | 2.10 | 2.17 |

TABLE 2

|  |  | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|
| Composition (%) | $SiO_2$ | 74.6 | 66.9 | 71.6 | 70.7 | 70.7 | 70.0 | 71.9 | 70.2 | 70.2 |
|  | $Al_2O_3$ | 0.5 | 5.6 | 3.4 | 3.3 | 3.3 | 3.2 | 3.2 | 3.2 | 3.2 |
|  | MgO | 0.5 | 1.8 | 0.0 | 0.1 | 0.1 | 0.6 | 0.3 | 0.3 | 0.3 |
|  | CaO | 11.1 | 7.6 | 9.2 | 9.3 | 9.3 | 8.3 | 8.7 | 8.7 | 8.7 |
|  | $Na_2O$ | 9.4 | 17.2 | 10.6 | 14.3 | 14.3 | 14.1 | 12.1 | 14.1 | 14.1 |
|  | $K_2O$ | 3.0 | 0.0 | 4.4 | 1.5 | 1.5 | 1.1 | 1.1 | 1.1 | 1.1 |
|  | $t\text{-}Fe_2O_3$ | 0.68 | 0.68 | 0.68 | 0.67 | 0.66 | 0.56 | 0.56 | 0.54 | 0.56 |
|  | $TiO_2$ |  |  |  | 0.01 | 0.01 | 0.31 | 0.31 | 0.71 | 0.42 |
|  | $CeO_2$ |  |  |  |  |  | 1.84 | 1.84 | 1.10 | 1.30 |
|  | $SnO_2$ | 0.22 | 0.22 | 0.22 | 0.10 | 0.05 |  |  |  |  |
|  | $SO_3$ | 0.005 | 0.006 | 0.005 | 0.013 | 0.015 |  |  |  |  |
| Fe-redox (%) |  | 56 | 54 | 53 | 62 | 60 | 58 | 56 | 58 | 59 |
| $SnO_2/SO_3$ |  | 42.98 | 37.25 | 42.98 | 7.69 | 3.33 | — | — | — | — |
| $(SnO_2/SO_3)$/Fe-redox |  | 0.77 | 0.69 | 0.82 | 0.12 | 0.06 | — | — | — | — |
| β-OH ($mm^{-1}$) |  | 0.30 | 0.26 | 0.32 | 0.30 | 0.25 | 0.23 | 0.28 | 0.22 | 0.31 |
| Tv (%) |  | 69.3 | 66.4 | 70.4 | 68.0 | 68.3 | 70.5 | 70.2 | 70.5 | 70.3 |
| Te (%) |  | 34.6 | 33.4 | 35.7 | 33.1 | 33.4 | 35.6 | 35.2 | 35.9 | 35.4 |
| Dw (nm) |  | 488.2 | 488.3 | 488.5 | 489.0 | 489.3 | 493 | 504 | 503 | 494 |
| Tv/Te |  | 2.00 | 1.99 | 1.97 | 2.05 | 2.04 | 1.98 | 1.99 | 1.96 | 1.99 |
| $1.252 \times (t\text{-}Fe_2O_3) + 1.260$ |  | 2.11 | 2.11 | 2.11 | 2.10 | 2.09 | 1.96 | 1.96 | 1.93 | 1.96 |

TABLE 3

|  |  | Ex. 19 | Ex. 20 | Ex. 21 | Ex. 22 | Ex. 23 | Ex. 24 |
|---|---|---|---|---|---|---|---|
| Composition (%) | $SiO_2$ | 68.9 | 69.1 | 69.2 | 72.3 | 72.3 | 72.3 |
|  | $Al_2O_3$ | 3.5 | 3.5 | 3.2 | 1.3 | 1.3 | 1.3 |
|  | MgO | 0.0 | 0.3 | 0.3 | 4.7 | 4.7 | 4.7 |
|  | CaO | 10.0 | 9.6 | 9.3 | 8.3 | 8.3 | 8.3 |
|  | $Na_2O$ | 14.5 | 14.5 | 14.0 | 12.5 | 12.5 | 12.5 |
|  | $K_2O$ | 0.3 | 0.3 | 1.1 | 0.6 | 0.6 | 0.6 |
|  | $t\text{-}Fe_2O_3$ | 0.54 | 0.52 | 0.56 | 0.25 | 0.25 | 0.24 |
|  | $TiO_2$ | 0.31 | 0.34 | 0.31 |  |  |  |
|  | $CeO_2$ | 1.85 | 1.78 | 1.85 |  |  |  |
|  | $SnO_2$ |  |  |  | 0.23 | 0.23 | 0.23 |
|  | $SO_3$ |  |  |  | 0.061 | 0.062 | 0.057 |
| Fe-redox (%) |  | 55 | 53 | 55 | 61.0 | 72.7 | 77.9 |
| $SnO_2/SO_3$ |  | — | — | — |  |  |  |
| $(SnO_2/SO_3)$/Fe-redox |  | — | — | — |  |  |  |
| β-OH ($mm^{-1}$) |  | 0.21 | 0.33 | 0.27 | — | — | — |
| Tv (%) |  | 71.4 | 72.6 | 71.0 | 81 | 79 | 76 |
| Te (%) |  | 37.4 | 39.1 | 36.6 | 56 | 51 | 47 |
| Dw (nm) |  | 494 | 496 | 494 |  |  |  |

TABLE 3-continued

|  | Ex. 19 | Ex. 20 | Ex. 21 | Ex. 22 | Ex. 23 | Ex. 24 |
|---|---|---|---|---|---|---|
| Tv/Te | 1.91 | 1.86 | 1.94 | 1.45 | 1.55 | 1.62 |
| $1.252 \times$ (t-Fe$_2$O$_3$) + 1.260 | 1.94 | 1.91 | 1.97 | 1.57 | 1.57 | 1.56 |

TABLE 4

| | | Ex. 25 | Ex. 26 | Ex. 27 | Ex. 28 |
|---|---|---|---|---|---|
| Composition (%) | SiO$_2$ | \multicolumn{4}{c}{73.3 to 73.9} | | |
| | Al$_2$O$_3$ | 0.12 to 0.16 | | | |
| | MgO | 3.6 to 3.8 | | | |
| | CaO | 8.5 to 8.8 | | | |
| | Na$_2$O | 13.2 to 13.6 | | | |
| | K$_2$O | 0.031 to 0.034 | | | |
| | t-Fe$_2$O$_3$ | 0.632 | 0.72 | 0.45 | 1.0 |
| | TiO$_2$ | | | | |
| | CeO$_2$ | | | | |
| | SnO$_2$ | | | | |
| | SO$_3$ | | | | |
| | CoO | 0.0006 | 0.0006 | 0.0007 | 0.0007 |
| Fe-redox (%) | | 50.3 | 47.5 | 58 | 36 |
| SnO$_2$/SO$_3$ | | — | — | — | — |
| (SnO$_2$/SO$_3$)/Fe-redox | | — | — | — | — |
| β-OH (mm$^{-1}$) | | — | — | — | — |
| LTA (%) 3.9 mm thickness | | 66.2 | 65.5 | 72.4 | 65.8 |
| TSET (%) 3.9 mm thickness | | 37.4 | 36.1 | 44.9 | 36.2 |
| Dw (nm) | | — | — | — | — |
| LTA/TSET | | 1.77 | 1.81 | 1.61 | 1.82 |
| $1.252 \times$ (t-Fe$_2$O$_3$) + 1.260 | | 2.05 | 2.16 | 1.82 | 2.51 |

TABLE 5

| | | Ex. 29 | Ex. 30 | Ex. 31 | Ex. 32 |
|---|---|---|---|---|---|
| Composition (%) | SiO$_2$ | 69.9 | 69.3 | 71.5 | 70.8 |
| | Al$_2$O$_3$ | 3.4 | 3.3 | 0.4 | 0.4 |
| | MgO | 0.1 | 0.1 | 4.1 | 4.1 |
| | CaO | 9.4 | 9.3 | 8.8 | 8.7 |
| | Na$_2$O | 13.8 | 13.6 | 13.2 | 13.1 |
| | K$_2$O | 1.6 | 1.6 | 0.1 | 0.1 |
| | t-Fe$_2$O$_3$ | 0.65 | 0.65 | 0.59 | 0.59 |
| | TiO$_2$ | 0.02 | 0.02 | | |
| | CeO$_2$ | 0.99 | 1.96 | 0.99 | 1.96 |
| | SnO$_2$ | 0.19 | 0.19 | 0.22 | 0.22 |
| | SO$_3$ | 0.006 | 0.006 | 0.010 | 0.010 |
| Fe-redox (%) | | 61 | 61 | 61 | 61 |
| SnO$_2$/SO$_3$ | | 31.67 | 31.67 | 22.53 | 22.35 |
| (SnO$_2$/SO$_3$)/Fe-redox | | 0.52 | 0.52 | 0.37 | 0.37 |
| β-OH (mm$^{-1}$) | | 0.22 | 0.28 | 0.22 | 0.28 |
| Tv (%) | | (67.9) | (67.7) | (68.7) | (68.1) |
| Te (%) | | (32.9) | (32.3) | (34.5) | (33.8) |
| Dw (nm) | | (487.0) | (487.0) | (487.0) | (487.1) |
| Tv/Te | | (2.06) | (2.07) | (2.00) | (2.01) |
| $1.252 \times$ (t-Fe$_2$O$_3$) + 1.260 | | 2.08 | 2.07 | 2.00 | 1.99 |

Ex. 1 to 14 and 29 to 32 are Example of the present invention, and Ex. 15 to 28 are Comparative Examples.

Ex. 15 to 21 are cited from Examples disclosed in Patent Document 2 (WO2012/102176), Ex. 22 to 24 are cited from Examples in Patent Document 3 (WO2011/093284), and Ex. 25 to 28 are cited from Examples disclosed in Patent Document 1 (U.S. Pat. No. 6,673,730). In Ex. 25 to 28, LTA and TSET were employed as indices to the visible light transmittance and the solar transmittance, respectively, and LTA and TSET were regarded as being equal to Tv and Te, respectively.

The heat-absorbing glass plates of the present invention in Ex. 1 to 14 and 29 to 32 which are Examples of the present invention satisfied the following formulae and had high Tv/Te.

$Tv/Te > 1.70$ when $t$-Fe$_2$O$_3$ is less than 0.351%;

$Tv/Te > 1.252 \times t\text{-Fe}_2\text{O}_{3+1.260}$ when $t$-Fe$_2$O$_3$ is at least 0.351% and less than 0.559%; and $Tv/Te > 1.960$ when $t$-Fe$_2$O$_3$ is at least 0.559%.

In FIG. 1, the boundary between the above formulae is shown by a solid line.

The glass plates in Ex. 15 to 18 which are Comparative Examples had high Tv/Te, however, their color was inhomogeneous by amber coloring due to SO$_3$ since they did not contain SnO$_2$.

The glass plates in Ex. 19 to 21 which are Comparative Examples, which contained no SnO$_2$, were required to lower Fe-redox in order to suppress amber coloring.

The glass plates in Ex. 22 to 24 which are Comparative Examples, had high Te since their MgO content was high, and had low Tv/Te.

Of the glass plates in Ex. 25 to 28 which are Comparative Examples, Tv/Te was not sufficiently high relative to the proportion of t-Fe$_2$O$_3$.

INDUSTRIAL APPLICABILITY

The heat-absorbing glass plate of the present invention is characterized in that it satisfies both low solar transmittance and high visible light transmittance, and accordingly it is useful as a glass plate for vehicles and for building, and is particularly suitable as a glass plate for building.

This application is a continuation of PCT Application No. PCT/JP2015/062383 filed on Apr. 23, 2015, which is based upon and claims the benefit of priority from Japanese Patent Application No. 2014-089594 filed on Apr. 23, 2014. The contents of those applications are incorporated herein by reference in their entireties.

What is claimed is:

1. A heat-absorbing glass plate comprising iron, tin and sulfur, wherein, as represented by mass % based on oxides:
   the MgO content is at most 4.5%,
   the Na$_2$O content is from 5 to 18%,
   the CeO$_2$ content is from 0 to less than 0.8%,
   the amount of total tin as calculated as SnO$_2$ is less than 0.4%,
   the amount of total sulfur as calculated as SO$_3$ is from 0.005% to 0.1%, and
   the ratio (SnO$_2$/SO$_3$) of the amount of total tin to the amount of total sulfur as calculated as SO$_3$ is from 0.2 to 100.

2. The heat-absorbing glass plate according to claim 1, which comprises soda lime silica glass comprising the following composition, as represented by mass % based on oxides:
   SiO$_2$: 65 to 75%,
   Al$_2$O$_3$: more than 3% and at most 6%, MgO: 0% to less than 2%,
CaO: 7 to 10%,
Na$_2$O: 5 to 18%,
K$_2$O: 0 to 5%,
total iron as calculated as Fe$_2$O$_3$: 0.3 to 0.9%, and
total tin as calculated as SnO$_2$: 0.02 to 0.3%.

3. The heat-absorbing glass plate according to claim 1, wherein the amount of total sulfur as calculated as SO$_3$ as represented by mass % based on oxides is at least 0.005% and less than 0.02%.

4. The heat-absorbing glass plate according to claim 1, wherein the amount of total tin as calculated as SnO$_2$ as represented by mass % based on oxides is at least 0.09%.

5. The heat-absorbing glass plate according to claim 1, wherein the amount of total tin as calculated as SnO$_2$ as represented by mass % based on oxides is at least 0.15%.

6. The heat-absorbing glass plate according to claim 1, wherein as represented by mass % based on oxides, the content of CeO$_2$ is less than 0.6%.

7. The heat-absorbing glass plate according to claim 1, wherein the amount of total iron as calculated as Fe$_2$O$_3$ as represented by mass % based on oxides is from 0.01% to 1.0%.

8. The heat-absorbing glass plate according to claim 1, wherein as represented by mass % based on oxides, the amount of total iron as calculated as Fe$_2$O$_3$ is at least 0.1%.

9. The heat-absorbing glass plate according to claim 1, wherein the proportion of divalent iron as calculated as Fe$_2$O$_3$ to the total iron as calculated as Fe$_2$O$_3$ is at least 55%.

10. The heat-absorbing glass plate according to claim 1, wherein the proportion of divalent iron as calculated as Fe$_2$O$_3$ to the total iron as calculated as Fe$_2$O$_3$ is at least 61%.

11. The heat-absorbing glass plate according to claim 1, wherein the proportion of divalent iron as calculated as Fe$_2$O$_3$ to the total iron as calculated as Fe$_2$O$_3$ is at least 63%.

12. The heat-absorbing glass plate according to claim 1, wherein the ratio of SnO$_2$/SO$_3$ to Fe-redox i.e. (SnO$_2$/SO$_3$)/Fe-redox is from 0.0025 to 5.

13. The heat-absorbing glass plate according to claim 1, which contains substantially no TiO$_2$.

14. The heat-absorbing glass plate according to claim 1, which contains TiO$_2$ and has a TiO$_2$ content of at most 3% as represented by mass % based on oxides.

15. The heat-absorbing glass plate according to claim 1, wherein the ratio Tv/Te of the visible light transmittance Tv (by illuminant A, 2° visual field) as defined in JIS R3106 (1998) to the solar transmittance Te as defined in JIS R3106 (1998), and the amount of total iron t-Fe$_2$O$_3$ as calculated as Fe$_2$O$_3$ as represented by mass % based on oxides, calculated as 4 mm thickness of the glass plate, are in a relation of the following formulae:

$$Tv/Te > 1.70 \text{ when } t\text{-Fe}_2\text{O}_3 \text{ is less than } 0.351\%;$$

$$Tv/Te > 1.252 \times (t\text{-Fe}_2\text{O}_3) + 1.260 \text{ when } t\text{-Fe}_2\text{O}_3 \text{ is at least } 0.351\% \text{ and less than } 0.559\%; \text{ and}$$

$$Tv/Te > 1.960 \text{ when } t\text{-Fe}_2\text{O}_3 \text{ is at least } 0.559\%.$$

16. The heat-absorbing glass plate according to claim 1, wherein the ratio Tv/Te of the visible light transmittance Tv (by illuminant A, 2° visual field) as defined in JIS R3106 (1998) to the solar transmittance Te as defined in JIS R3106 (1998), and the amount of total iron t-Fe$_2$O$_3$ as calculated as Fe$_2$O$_3$ as represented by mass % based on oxides, calculated as 4 mm thickness of the glass plate, are in a relation of the following formulae:

$$Tv/Te > 1.70 \text{ when } t\text{-Fe}_2\text{O}_3 \text{ is less than } 0.351\%;$$

$$Tv/Te > 1.252 \times (t\text{-Fe}_2\text{O}_3) + 1.260 \text{ when } t\text{-Fe}_2\text{O}_3 \text{ is at least } 0.351\% \text{ and less than } 0.575\%; \text{ and}$$

$$Tv/Te > 1.980 \text{ when } t\text{-Fe}_2\text{O}_3 \text{ is at least } 0.575\%.$$

17. The heat-absorbing glass plate according to claim 1, wherein the ratio Tv/Te of the visible light transmittance Tv (by illuminant A, 2° visual field) as defined in JIS R3106 (1998) to the solar transmittance Te as defined in JIS R3106 (1998), and the amount of total iron t-Fe$_2$O$_3$ as calculated as Fe$_2$O$_3$ as represented by mass % based on oxides, calculated as 4 mm thickness of the glass plate, are in a relation of the following formulae:

$$Tv/Te > 1.70 \text{ when } t\text{-Fe}_2\text{O}_3 \text{ is less than } 0.351\%; \text{ and}$$

$$Tv/Te > 1.252 \times (t\text{-Fe}_2\text{O}_3) + 1.260 \text{ when } t\text{-Fe}_2\text{O}_3 \text{ is at least } 0.351\%.$$

18. The heat-absorbing glass plate according to claim 1, which provides a transmitted light having a dominant wavelength Dw of less than 492 nm calculated as 4 mm thickness of the glass plate as defined in JIS Z8701 (1982).

19. The heat-absorbing glass plate according to claim 1, which provides a transmitted light having a dominant wavelength Dw of at least 492 nm calculated as 4 mm thickness of the glass plate as defined in JIS Z8701 (1982).

20. The heat-absorbing glass plate according to claim 1, wherein the ratio Tv/Te of the visible light transmittance Tv (by illuminant A, 2° visual field) as defined in JIS R3106 (1998) to the solar transmittance Te as defined in JIS R3106 (1998), calculated as 4 mm thickness of the glass plate, is at least 2.0.

21. The heat-absorbing glass plate according to claim 1, wherein the solar transmittance Te is at most 50% calculated as 4 mm thickness of the glass plate as defined in JIS R3106 (1998), and the visible light transmittance Tv (by illuminant A, 2° visual field) is at least 60% calculated as 4 mm thickness of the glass plate as defined in JIS R3106 (1998).

22. The heat-absorbing glass plate according to claim 1, wherein β-OH is at least 0.15 mm$^{-1}$.

23. A process for producing a heat-absorbing glass plate, which comprises melting a glass raw material, followed by forming to produce soda lime silica glass, wherein the glass after the forming is the heat-absorbing glass plate as defined in claim 1.

* * * * *